United States Patent [19]
Clancy

[11] 3,816,738
[45] June 11, 1974

[54] CONVERTIBLE FLOOR SANITARY INSPECTION DEVICE

[76] Inventor: William B. Clancy, 5606 Rolling Ridge Dr. East, San Antonio, Tex. 78228

[22] Filed: Feb. 27, 1973

[21] Appl. No.: 336,232

[52] U.S. Cl. ............................. 240/2.18, 240/2 R
[51] Int. Cl. .............................................. F21l 1/00
[58] Field of Search ............ 240/2 R, 2.18, 2 VC, 6, 240/81 P, DIG. 8

[56] References Cited
UNITED STATES PATENTS
| | | | |
|---|---|---|---|
| 1,907,314 | 2/1933 | Baer | 240/2.18 |
| 2,580,699 | 1/1952 | Pfetzing | 240/2.18 |
| 2,677,751 | 5/1954 | Marchand | 240/61 X |

FOREIGN PATENTS OR APPLICATIONS
| | | | |
|---|---|---|---|
| 462,319 | 7/1928 | Germany | 240/2.18 |

*Primary Examiner*—Fred L. Braun
*Attorney, Agent, or Firm*—Willard J. Hodges, Jr.

[57] ABSTRACT

A self-contained, portable inspection device adapted to convert from the carrying position to the inspection position. The device comprises a power supply, diagonally diposed mirrors, and a light means mounted in an enclosed case with self-contained casters, a telescopingly combined carrying and control handle, and mirror positioning source constituting a device particularly suited to inspect food storage and warehouse facilities.

5 Claims, 6 Drawing Figures

3,816,738

CONVERTIBLE FLOOR SANITARY INSPECTION DEVICE

BACKGROUND OF THE INVENTION

1. Field of the Invention

Government agencies and food processors, distributors find need for inspection aids to insure the highest standards of sanitation in storage facilities. The device of this invention is a self-contained, hand portable aid which includes self-contained power supply for illuminating floor areas with mirror means assisting in the viewing and inspection of enclosed or covered areas adjacent the floor.

2. Description of Prior Art

Various devices using a combination of light source and mirrors for viewing places of limited access are known to the prior art. Typical examples are U.S. Pat. No. 2,740,882 characterized as a mirror scope; No. 3,452,189, a sewer periscope; and No. 2,580,699, a device for viewing the undercarriage of a vehicle. None of the foregoing devices are particularly suited or adapted for sanitary inspection and viewing under storage pallets in food warehouses.

SUMMARY OF THE INVENTION

Requisites for improved sanitary conditions, inspection and pest detection and control in warehouse facilites prompted this invention. In normal storage procedures, food cartons and other items packaged in paper cartons demand early detection of pests and prompt remedial action. Cartons are normally stored in warehouses on wooden pallets which have a height of 4 or 5 inches from the floor. Inspection of the floor area underneath these pallets presents a difficult lighting and viewing problem. One method of inspection would be to place the eye at floor level and illuminate the area with a flashlight. Such procedure is awkward and physically difficult, as well as time consuming.

One of the objects of this invention was to provide a portable device rapidly convertible to the operating configuration whereby inspection of large floor areas may be performed from an erect walking position. Another object was to develop a device to assist in performing a more thorough inspection in a minimum period of time with less physical exertion.

The device of this invention in the carrying position presents the general configuration of an item of hand luggage. The folded device has an outward appearance of a box-like structure with a carrying handle.

In the inspection configuration, a front flap is folded up to expose the spotlights and inspection mirrors. The carrying handle converts into an elongated control handle and the combination is rolled along the floor adjacent the area to be viewed. Compatible position of the spotlights and mirrors normally require little adjustment; however, the lights are adjustable and a mirror tilt control means permits positioning of the mirrors to vary the field of view. The device is mounted on two fixed casters and a swivelly mounted steering caster. The preferred embodiment incorporated a self-contained power source such as a battery which powered seal beam or reflector mounted bulbs. An extension cord with external source of power could be employed; however, the preferred embodiment utilized a self-contained battery.

For a detailed description of the preferred embodiment, reference is made to the attached several views wherein identical reference characters will be employed to refer to identical or equivalent components throughout the several views and in the following detailed description.

DESCRIPTION OF THE PREFERRED EMBODIMENT

Figure 1:
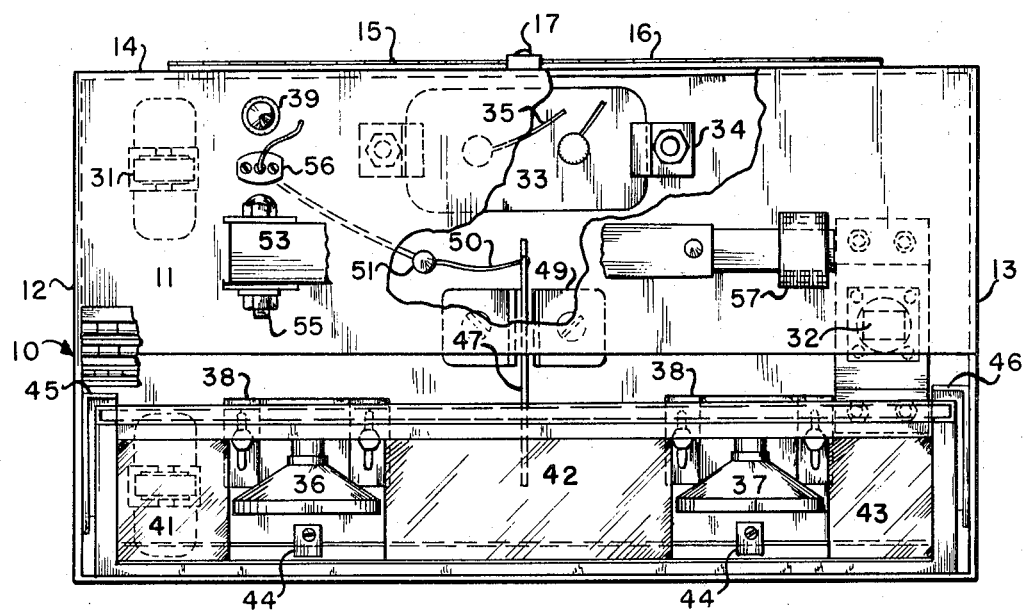
FIG. 1 is a top planned view of the inspection device partially fragmented.

The prototype of the device was constructed utilizing a plastic outer case and many plastic components. The preferred embodiment, however, was constructed employing sheet aluminum alloy 3/16 inch thickness with metal hinges commonly referred to as piano type hinges. For a detailed description of the method of construction of the preferred embodiment, reference is made to the attached several views. The outer case 10 is preferably constructed from heavy sheet aluminum alloy. Most of the components are mounted on or secured to floor plate 11. Projecting upward from floor plate 11 is a first end wall 12 and a second end wall 13. The box-like structure includes back wall 14 into which is constructed back flap 15 which is pivotally secured to back wall 14 by back hinge 16 which might be of any configuration; however, for appearance and durability, the preferred embodiment employed piano type hinges throughout. Back flap 15 is secured in the closed position by back hinge catch 17. Top 18 is securely affixed to the first and second end walls 12 and 13 and back wall 14. Projecting forward from top 18 to complete the enclosed structure is the foldable sectional hinge combination collectively designated as front flap 20 pivotally secured to top 18 by a top hinge 21. The first section of this device is top flap 22 terminating in top edge hinge 23. Extending downward is front wall 24 which comprises a front wall top panel 25, a front wall center hinge 26, and a front wall lower panel 27. The closed configuration of the foregoing components completely encases the interior components of this device.

Figure 2:
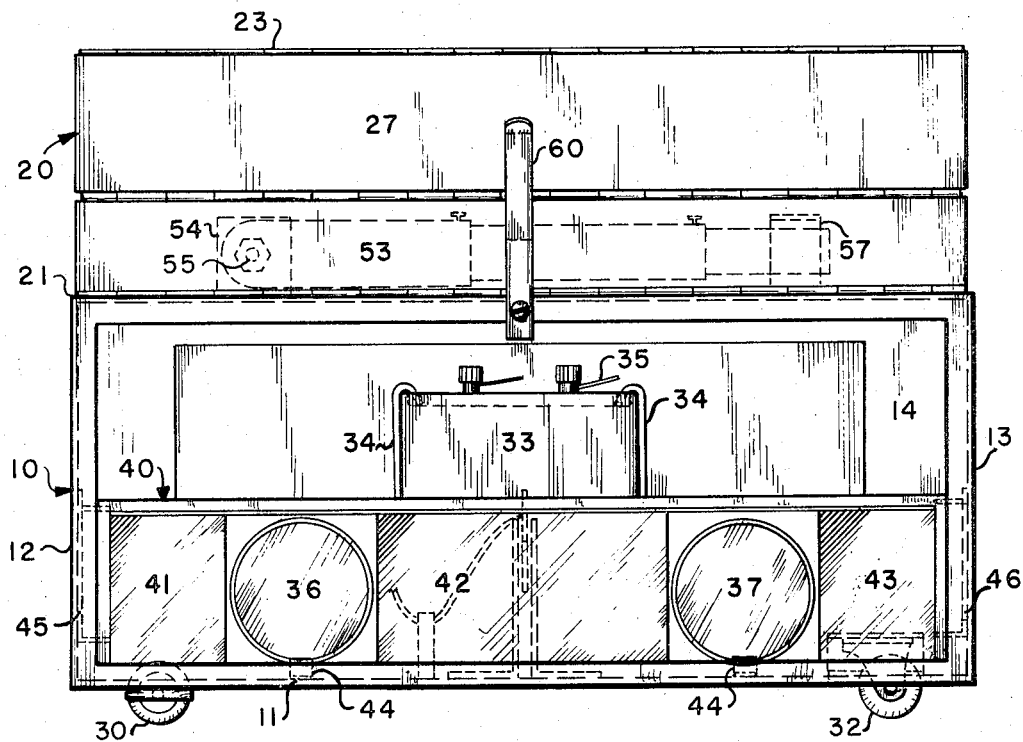
FIG. 2 is a side elevation view of the device in the operating configuration illustrating principally the spotlights and viewing mirrors.
Figure 3:
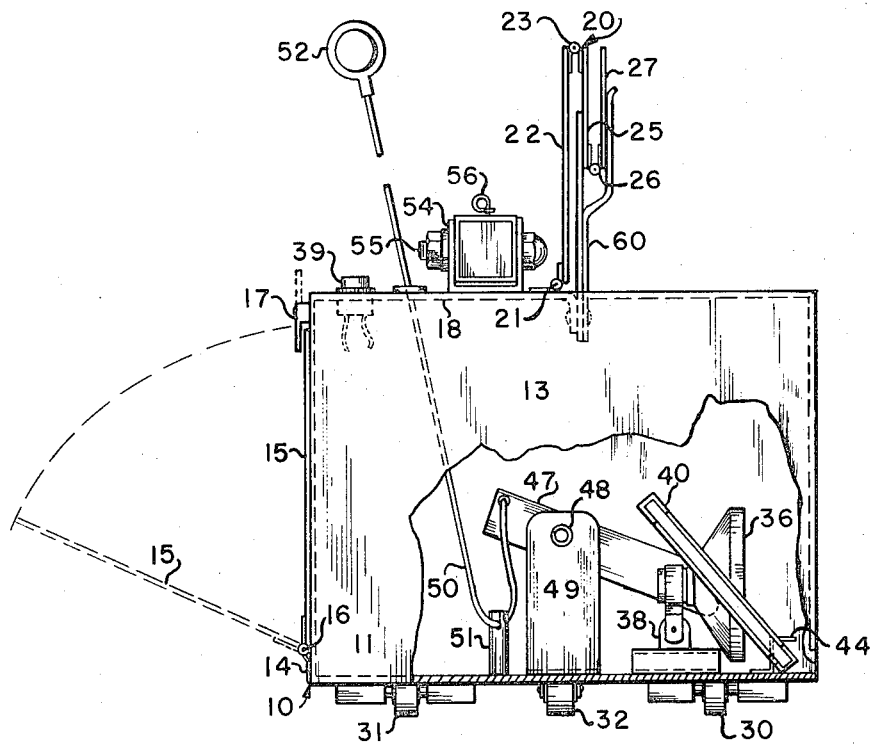
FIG. 3 is an end view taken partially fragmented illustrating particularly the mirror tilt mechanism.
Figure 4:
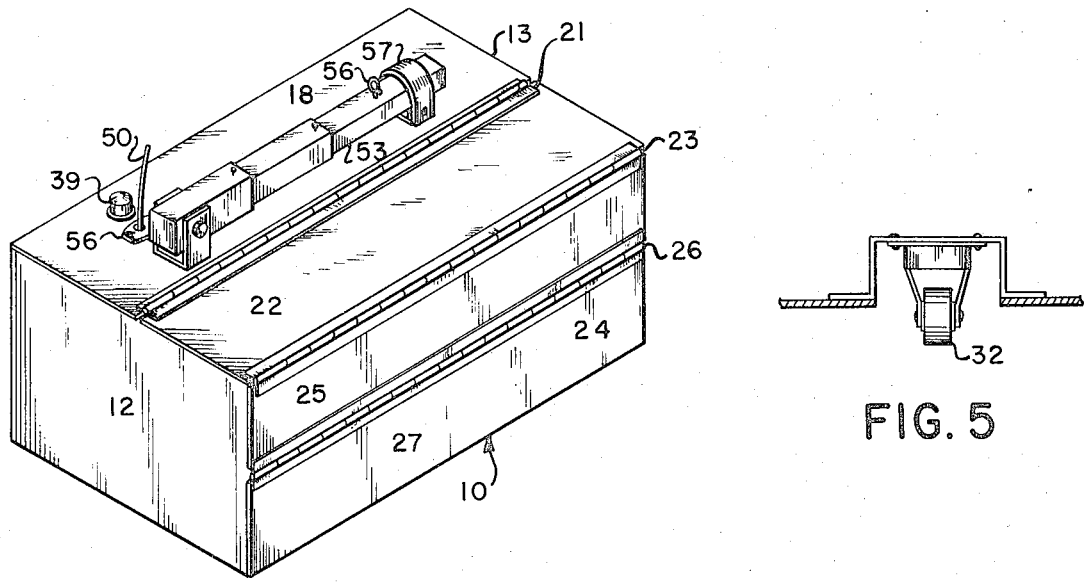
FIG. 4 is a perspective view of the device in the portable hand-carried configuration.

Secured to the underneath surface of floor plate 11 adjacent one edge is rotatibly mounted a first stationary caster 30 and opposite it a second rotatible stationary caster 31. The opposite end of the floor plate is operably mounted a steering swivel caster 32. The foregoing three casters permit the device to be rolled and steered along a smooth surface. Mounted on the top side of floor plate 11 are the operating components which include battery 33 which is secured to floor plate 11 by battery hold down means 34. Wiring harness 35 of a suitable configuration interconnects battery 33 and first spotlight 36 and second spotlight 37. These spotlights 36 and 37 are secured to floor plate 11 by spotlight mounting means 38. Wiring harness 35 interconnecting battery 33 and spotlights 36 and 37 include an on-off switch 39. Diagonally mounted on floor plate 11 adjacent front wall lower flap 27 is mirror frame 40. This frame 40 is tiltably secured at approximately a 45° angle. Mounted in mirror frame 40 is a first mirror 41, a central mirror 42, and a second mirror 43. The mirrors 41, 42 and 43 are interspersed with spotlights 36 and 37. Lower edge of mirror frame 40 may rest on floor plate 11 or be secured by a mirror hinge 44. The foregoing referred to mirrors and mirror frame 40 are generally aimed in the operable position by first mirror end support 45 diagonally secured at 45° angle on first end wall 12. Also compatibly secured to second end wall 13 is second mirror end support 46. Mounted in the rear of mirror frame 40 is a mirror tilt means which is perhaps best illustrated in FIG. 3. This mechanism comprises a mirror tilt lever 47 mounted on tilt lever pivot 48 which is secured to floor plate 11 by tilt lever bracket 49. These tilt components are operated by means of tilt lever control line 50 which projects through control line hold down 51 which is mounted on floor plate 11. One end of tilt lever control line secured to mirror tilt lever 47 at the opposite end of control line 50 is a control line ring 52. Tiltably secured to the top 18 of outer case 13 is telescoping control handle 53. This handle is attached to top 18 by means of control handle mounting bracket 54 through which projects control handle pivot 55 securing telescoping control handle 53 to top 18. Suitably dispersed along telescoping control handle 53 are control line eyelets 56. Tilt lever control line 50 projects through these eyelets 56 retaining the control line 50 adjacent handle 53. In the collapsed configuration, telescoping control handle 53 will project under carrying handle stirrup 57. This configuration is perhaps best illustrated in FIG. 4 which is the inoperable or portable configuration of the device. In the operable configuration, telescoping control handle 53 is extended carrying with it tilt lever control line 50 and various components of front flap 20 is lifted into an erect position as illustrated in FIGS. 2 and 3. These various foldable components are secured in the open position by means of front flap open clasp 60 as illustrated in FIG. 3.

OPERATION OF THE DEVICE

Figure 5:
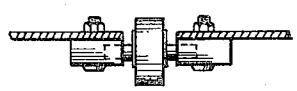
FIG. 5 is a fragmented, detailed view of the steering caster.
Figure 6:
FIG. 6 is a fragmented, detailed view of one of the fixed casters.

In this open configuration of the outer case as illustrated in FIG. 3, the spotlights 36 and 37 are activated by means of the on-off switch 39. The device may be rolled along the floor supported by fixed casters illustrated in FIG. 6 and steerably controlled by means of control handle 53 and its consequent result on steering caster 32 of FIG. 5. In this configuration, the device may be pushed along the floor in front of the operator and extensive floor areas viewed underneath large pallets adjacent the floor with the operator standing in a comfortable, upright configuration. A downward look into mirrors 41, 42 and 43 into the areas illuminated by spotlights 46 and 47 will present a clear view of an expansive floor area. A slight tensioning of control line 50 by means of control line ring 52 will through tilt lever 47 position mirror frame 40 for the optimum positioning of mirrors 41, 42 and 43.

Having described in detail the construction and operation of the device, what is desired to be claimed is all modifications or equivalents not departing from the scope of the invention as defined in the appended claims.

I claim:

1. A convertible floor sanitary inspection device having a closed position and an open position comprising:

a. a floor plate having a first end and a second end, b. multiple casters mounted on said floor plate, c. a light member capable of illuminating an adjacent floor area mounted on said floor plate, d. a mirror mounted on and supported adjacent said floor plate, e. a mirror positioning means mounted on said floor plate adjacent said mirror capable of supporting said mirror in a viewing position, f. a control handle interconnected to said floor plate adapted to roll said inspection device on said casters along a floor area to be inspected, g. an outer case secured to said floor plate, h. an electrical power source mounted on said floor plate, i. said mirror positioning means including a mirror tilt lever positioned adjacent said mirror, said lever contacting and varying the angle of view of said mirror, j. a tilt lever control line compatibly retained adjacent said control handle, said control line operably connected to said mirror tilt lever, k. said control handle further comprising:
      1. a telescoping control handle convertible from an operable position to a portable carrying position, and
      2. control line eyelets secured to said control handle for receiving and operably retaining said tilt lever control line, and l. a control handle stirrup interconnected to said floor plate for receiving and retaining said telescoping control handle in a portable carrying position.

2. The invention of claim 1 further comprising:

a. a wiring harness interconnecting said electrical power source and said light member, and b. an on-off switch conductively positioned in said wiring harness.

3. The invention of claim 1 wherein said multiple casters further comprise:

a. a first stationary caster secured adjacent one corner of said first end of said floor plate, b. a second stationary caster secured adjacent the opposite corner of said first end of said floor plate, and c. a steerable, swivel caster mounted in substantially the center of the second end of said floor plate.

4. A convertible floor sanitary inspection device having a closed position and an open position comprising:

a. a floor plate having a first end and a second end, b. multiple casters mounted on said floor plate, c. a light member capable of illuminating an adjacent floor area mounted on said floor plate, d. a mirror mounted on and supported adjacent said floor plate, e. a mirror positioning means mounted on said floor plate adjacent said mirror capable of supporting said mirror in a viewing position, f. a control handle interconnected to said floor plate adapted to roll said inspection device on said casters along a floor are to be inspected,
g. a top member having a first edge and a second edge supported above said floor plate,
h. a top hinge secured adjacent said first edge of said top member,
i. a top flap hingedly secured to said top hinge,
j. a top edge hinge secured to said top flap,
k. a front wall top panel having a top edge and a lower edge, said top edge being hingedly secured to said top edge hinge,
l. a front wall center hinge secured to the lower edge of said front wall top panel,
m. a front wall lower panel hingedly secured to said front wall center hinge; and
n. a front flap open clasp grasping and supporting said top flap, said front wall top panel and said front wall lower panel in the open position when said case is in the open, operable position.

5. The device of claim 4 when said multiple casters further comprise:
a. a first stationary caster secured adjacent one corner of said first end of said floor plate,
b. a second stationary caster secured adjacent the opposite corner of said first end of said floor plate, and
c. a steerable, swivel caster mounted in substantially the center of the second end of said floor plate.

* * * * *